US005394161A

United States Patent [19]

Ubaldo et al.

[11] Patent Number: 5,394,161

[45] Date of Patent: Feb. 28, 1995

[54] PATH FINDER/TRACKER SYSTEM

[76] Inventors: Richard Ubaldo, 243 Hills Beach Rd., Biddeford, Me. 04005; John Ubaldo, c/o D. H. Blair, 44 Wall St., 11th Floor, New York, N.Y. 10005

[21] Appl. No.: 158,208

[22] Filed: Nov. 29, 1993

[51] Int. Cl.[6] ........................ H01Q 1/24; G06F 15/50

[52] U.S. Cl. .................................... 343/702; 343/894; 33/290; 364/457

[58] Field of Search ............... 343/702, 760, 894, 793, 343/808, 809, 711; 33/290; 364/444, 457; H01Q 1/24

[56] References Cited

U.S. PATENT DOCUMENTS

| | | | |
|---|---|---|---|
| 3,857,639 | 12/1974 | Mason | 356/156 |
| 4,379,366 | 4/1983 | Kuno et al. | 33/361 |
| 4,673,936 | 6/1987 | Kotoh | 342/51 |
| 4,728,959 | 3/1988 | Maloney et al. | 342/457 |
| 4,866,627 | 9/1989 | Suyama | 364/457 |
| 5,003,316 | 3/1991 | Ostermiller | 342/429 |

*Primary Examiner*—Donald Hajec
*Assistant Examiner*—Hoanganh Le
*Attorney, Agent, or Firm*—Hugh E. Smith

[57] ABSTRACT

A path finder/tracker system for assisting a person in finding the way back to a home base comprising a transmitter having a housing with electronic components therein, the electronic components including a emitter to emit a signal of a predetermined magnitude and frequency, the transmitter couplable to a power source with an on/off switch; and a receiver having a housing with electrical components including associated electrical components to receive the signal of the predetermined magnitude and frequency in the citizen band range tuned to that emitted by the transmitter, an antenna adapted to be retracted to a storage position within the receiver housing and extendable from the front edge thereof in a horizontal plane which is within the plane of the receiver, the receiver also including an array of lights across the front edge and adapted to sequentially light as a function of the strength of the signal received by the antenna whereby when the antenna is pointing directly at the transmitter, a predetermined light will be lit but when not pointed directly at the signal, another light will be lit, a panel to display the distance of the receiver from the transmitter.

6 Claims, 3 Drawing Sheets

FIG. 5
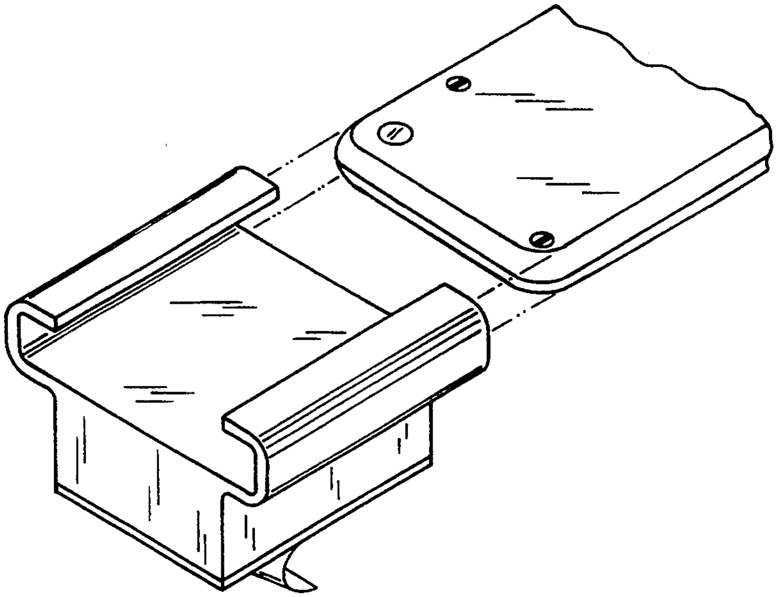
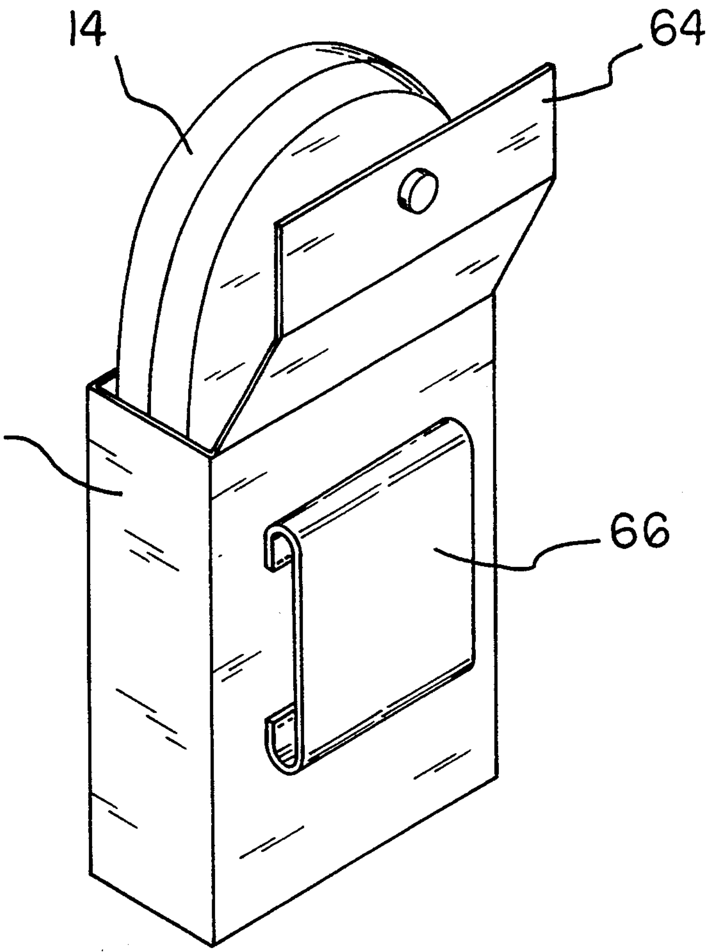
FIG. 6

PATH FINDER/TRACKER SYSTEM

BACKGROUND OF THE INVENTION

1. Field of the Invention

The present invention relates to path finder/tracker system and more particularly pertains to apparatus which may be used by sports persons for determining their location.

2. Description of the Prior Art

The use of locators is known in the prior art. More specifically, locators heretofore devised and utilized for the purpose of electronically determining one's position are known to consist basically of familiar, expected and obvious structural configurations, notwithstanding the myriad of designs encompassed by the crowded prior art which have been developed for the fulfillment of countless objectives and requirements.

A wide variety of prior art devices have been developed. For all practical purposes they are complex systems with excessively complex electronic components for determining positions anywhere in the world including the use of satellites for directing and redirecting signal transmittance of various types. Note for example U.S. Pat. No. 5,003,316 to Ostermiller; U.S. Pat. No. 4,866,627 to Suyama; U.S. Pat. No. 5,067,081 to Person; U.S. Pat. No. 5,075,696 to Wilby; U.S. Pat. No. 4,379,366 to Kuno and U.S. Pat. No. 4,104,803 to Hoeppel. None of these prior art devices relate to a system of reduced cost and size capable of being readably used by outdoors persons when hunting.

In this respect, the path finder/tracker system according to the present invention substantially departs from the conventional concepts and designs of the prior art, and in so doing provides an apparatus primarily developed for the purpose of electronically determine one's position.

Therefore, it can be appreciated that there exists a continuing need for new and improved locators which can be used for determining one's position. In this regard, the present invention substantially fulfills this need.

SUMMARY OF THE INVENTION

In view of the foregoing disadvantages inherent in the known types of locators now present in the prior art, the present invention provides an improved path finder/tracker system. As such, the general purpose of the present invention, which will be described subsequently in greater detail, is to provide a new and improved path finder/tracker system apparatus and method which has all the advantages of the prior art locator and none of the disadvantages.

To attain this, the present invention essentially comprises a path finder/tracker system for assisting an outdoors person in finding the way back to a home base comprising, in combination a transmitter having a housing with electronic components therein, the electronic components including emitter means to emit a signal of a predetermined magnitude and frequency in the citizen band range, the transmitter also couplable a power source with an on/off switch to activate and inactivate the emitter means by coupling and uncoupling the power thereto from the power source, the power source including an electrical line having an outboard terminal couplable to the opening of a cigarette lighter in a vehicle in which the transmitter is located, the transmitter when coupled to a source of power constituting the home base; and a receiver having a housing with electrical components therein including means to receive the signal of the predetermined magnitude and frequency in the citizen band range tuned to that frequency being emitted by the transmitter, a dipole antenna adapted to be retracted to a storage position within the receiver housing and extendable from the front edge thereof in a V-shaped configuration in a horizontal plane when the receiver is held in a horizontal plane, the receiver also including an array of lights adjacent to the front edge thereof and adapted to sequentially light as a function of the strength of the signal received by the dipole antenna whereby when the dipole antenna is pointing directly at the transmitter, the central light will be illuminated but when not pointed directly at the transmitter, another light will be illuminated, a panel to display an output indicative of the distance of the receiver from the transmitter as a function of the strength of the received signal and a compass to determine the magnetic direction of the transmitter with respect to the receiver after the dipole antenna is directly facing the transmitter whereby a user may determine the location and distance from the transmitter.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved path finder/tracker system which has all the advantages of the prior art locator and none of the disadvantages.

It is another object of the present invention to provide a new and improved path finder/tracker system which may be easily and efficiently manufactured and marketed.

It is a further object of the present invention to provide a new and improved path finder/tracker system which is of a durable and reliable construction.

An even further object of the present invention is to provide a new and improved path finder/tracker system which is susceptible of a low cost of manufacture with regard to both materials and labor, and which accordingly is then susceptible of low prices of sale to the consuming public, thereby making such locators economically available to the buying public.

Still yet another object of the present invention is to provide a new and improved path finder/tracker system which provides in the apparatuses and methods of the prior art some of the advantages thereof, while simultaneously overcoming some of the disadvantages normally associated therewith.

Still another object of the present invention is to determine one's location, direction and distance, from a home base.

Yet another object of the present invention is to assist outdoors persons precluding them from getting lost.

Even still another object of the present invention is to provide a new and improved a path finder/tracker system for assisting a person in finding the way back to a home base comprising a transmitter having a housing with electronic components therein, the electronic components including means to emit a signal of a predetermined magnitude and frequency, the transmitter couplable to a power source with an on/off switch; and a receiver having a housing with electrical components including means to receive the signal of the predetermined magnitude and frequency in the citizen band range tuned to that emitted by the transmitter, an antenna adapted to be retracted to a storage position within the receiver housing and extendable from the front edge thereof in a horizontal plane which is within the plane of the receiver, the receiver also including an array of lights across the front edge and adapted to sequentially light as a function of the strength of the signal received by the antenna whereby when the antenna is pointing directly at the transmitter, a predetermined light will be lit but when not pointed directly at the signal, another light will be lit, means to display the distance of the receiver from the transmitter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 5 and 6 are perspective views of cases and coupling mechanisms constructed in accordance with an alternate embodiment of the invention.

DESCRIPTION OF THE PREFERRED EMBODIMENT

Figure 1:
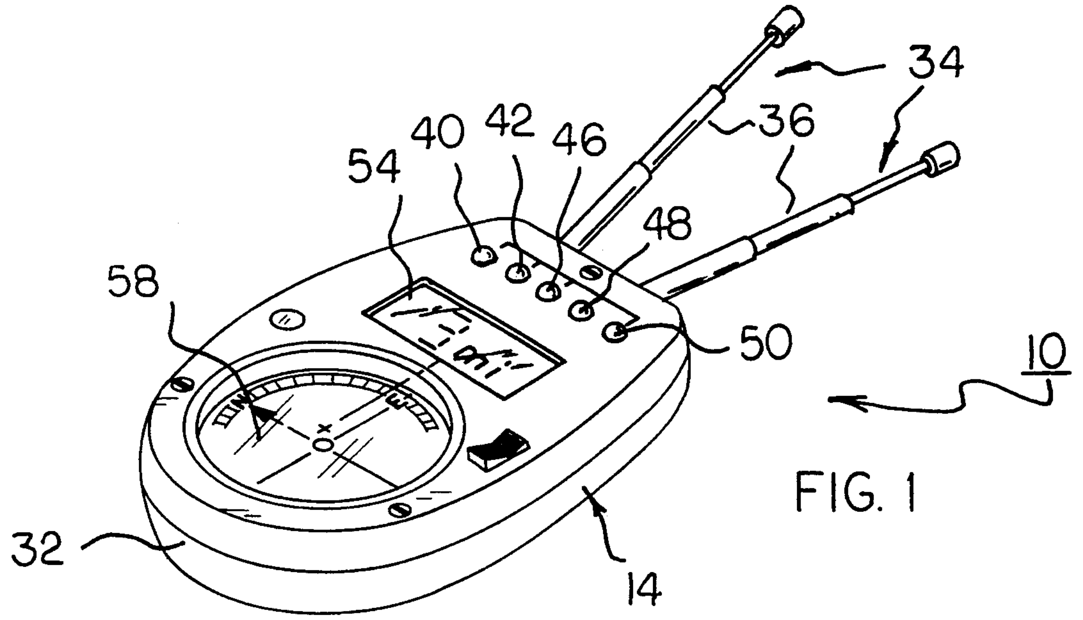
FIG. 1 is a perspective illustration of a receiver constructed in accordance with the principles of the present invention.

With reference now to the drawings, and in particular to FIG. 1 thereof, a new and improved path finder/-tracker system embodying the principles and concepts of the present invention and generally designated by the reference numeral 10 will be described.

Figure 2:
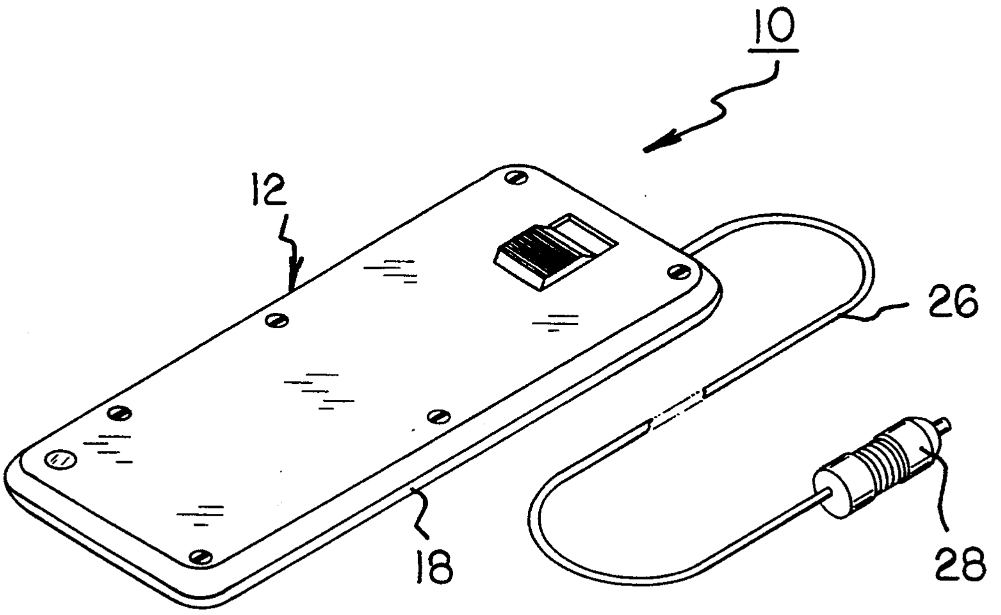
FIG. 2 is a perspective illustration of the transmitter constructed in accordance with the present invention.
Figure 3:
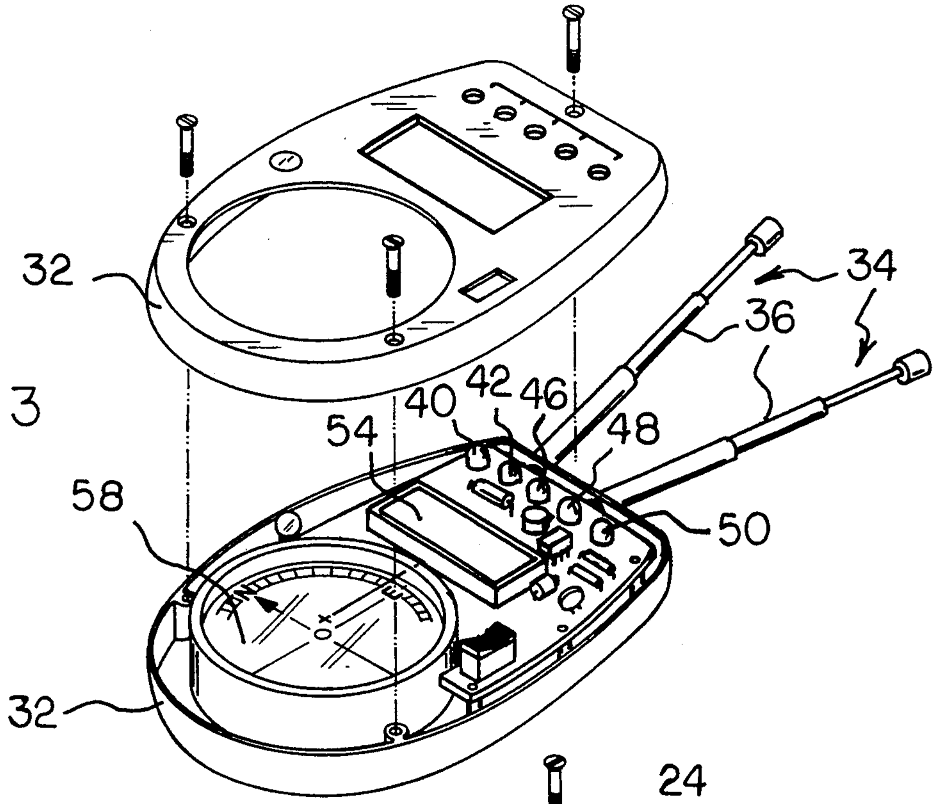
FIG. 3 is an exploded perspective view of the receiver shown in FIG. 1.

More specifically, it will be noted that, in FIGS. 1 and 2, the path finder/tracker system 10 of the present invention is configured for assisting an outdoors person in finding the way back to a home base. In its broadest terms, the system 10 comprises, in combination a transmitter 12 and a receiver 14.

Figure 4:
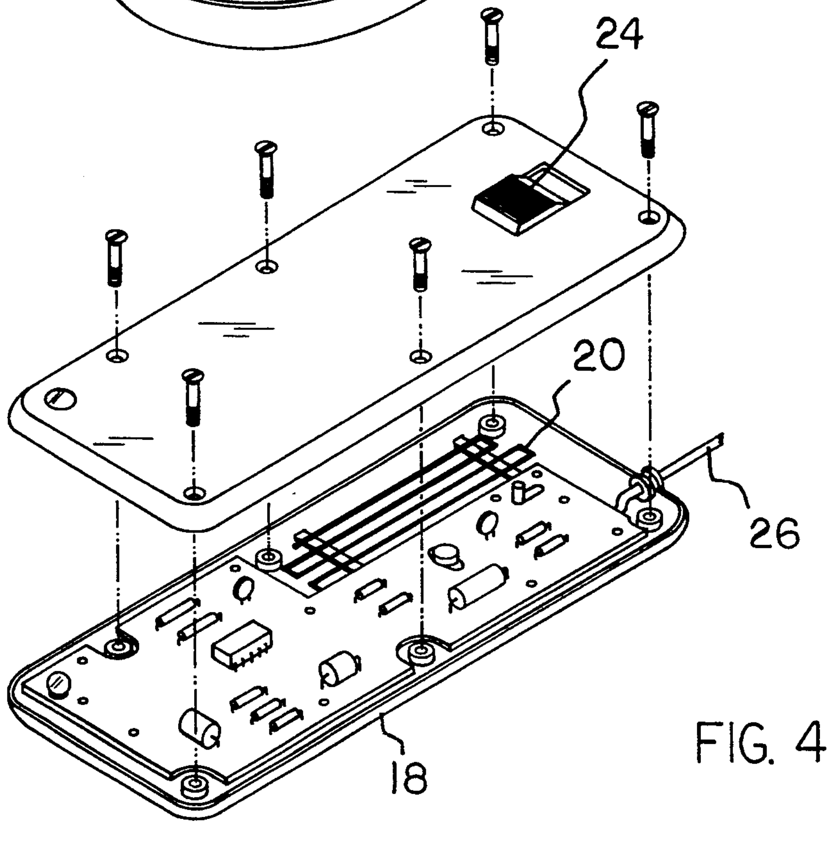
FIG. 4 is an exploded perspective view of the transmitter shown in FIG. 2.

The transmitter as seen in FIGS. 2 and 4 has a housing 18 with electronic components therein. The electronic components including emitter antenna 20 and associated components to emit a signal of a predetermined magnitude and frequency. Such frequency is preferably in the citizen band range. The transmitter also includes a power source couplable to the emitting antenna.

An on/off switch 24 is operator controlled to activate and inactivate the emitter antenna by coupling and uncoupling the power thereto from the power source. The power source preferably includes an electrical line 26 having an outboard terminal 28. Such terminal may be selectively coupled by an operator to the opening of a cigarette lighter of the vehicle in which the transmitter is located. Such vehicle constitutes the home base that the person with the receiver 14 is trying to locate.

The second major component of the system is the receiver 14. The receiver has a housing 32 with electrical components. Such electric components include means to receive the signal of the predetermined magnitude and frequency in the citizen band range. Associated electrical components are also provided. The components for generating and detecting the frequency are tuned between the emitter and the transmitter. A principle component of the receiver is an antenna 34, preferably a dipole antenna. The legs 36 of the antenna are adapted to be telescopically retracted to a storage position within the receiver housing. The legs of the antenna are also telescopically extendable from the front edge of the housing. The legs 36, when extended from a V-shaped configuration.

When in operation and use the legs lie in a horizontal plane, the same horizontal plane of the receiver.

The receiver 14 also includes an array of lights 40, 42, 46, 48, and 50 across the front edge of the housing. The lights are adapted to lit as a function of the strength of the signal received by the antenna. For example, when the antenna is pointing directly at the signal and transmitter 12, the central light 46 will be illuminated. When not directly pointed at the signal and transmitter 12, another light will be illuminated. When pointed almost directly at the transmitter, light 42 or 48 will be illuminated depending on which side of the antenna the transmitter is located. If pointed further offset angularly from the antenna, either light 40 or 50 will be illuminating depending to which side the transmitter is located. A panel 54 is provided to display the distance of the receiver 14 from the transmitter 12. The displayed distance is a function of the strength of the received signal. Further electrical components convert such signal to a readout. The readout may be by any conventional means. A liquid crystal display is preferred. Lastly, a compass 58 is provided to determine the direction of the transmitter with respect to the receiver after the antenna is directly facing the transmitter. In this manner a user may determine the location and distance from the transmitter by reference to a map.

The system also preferably includes a carrying case 62. The case is an enclosure with an open top and a flap 64 to cover the opening when the receiver 14 is located therein. A loop 66 is located on one side of the case for coupling to the apparel of the user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A path finder/tracker system for assisting an outdoors person in finding the way back to a home base comprising, in combination:

a transmitter having a housing with electronic components therein, the electronic components including emitter means to emit a signal of a predetermined magnitude and frequency in the citizen band range, the transmitter also couplable a power source with an on/off switch to activate and inactivate the emitter means by coupling and uncoupling the power thereto from the power source, the power source including an electrical line having an outboard terminal couplable to the opening of a cigarette lighter in a vehicle in which the transmitter is located, the transmitter when coupled to a source of power constituting the home base; and a receiver having a housing with electrical components therein including means to receive the signal of the predetermined magnitude and frequency in the citizen band range tuned to that frequency being emitted by the transmitter, a dipole antenna adapted to be retracted to a storage position within the receiver housing and extendable from the front edge thereof in a V-shaped configuration in a horizontal plane, when the receiver is held in a horizontal plane, the receiver also including an array of lights adjacent to the front edge thereof and adapted to sequentially light as a function of the strength of the signal received by the dipole antenna whereby when the dipole antenna is pointing directly at the transmitter, the central light will be illuminated but when not pointed directly at the transmitter, another light will be illuminated, a panel to display an output indicative of the distance of the receiver from the transmitter as a function of the strength of the received signal and a compass to determine the magnetic direction of the transmitter with respect to the receiver after the dipole antenna is directly facing the transmitter whereby a user may determine the location and distance from the transmitter.

2. A path finder/tracker system for assisting a person in finding the way back to a home base comprising:

a transmitter having a housing with electronic components therein, the electronic components including means to emit a signal of a predetermined magnitude and frequency, the transmitter couplable to a power source with an on/off switch; and a receiver having a housing with electrical components including means to receive the signal of the predetermined magnitude and frequency in the citizen band range tuned to that emitted by the transmitter, an antenna adapted to be retracted to a storage position within the receiver housing and extendable from the front edge thereof in a horizontal plane which is within the plane of the receiver, the receiver also including an array of lights across the front edge and adapted to sequentially light as a function of the strength of the signal received by the antenna whereby when the antenna is pointing directly at the transmitter, a predetermined light will be lit but when not pointed directly at the signal, another light will be lit, means to display the distance of the receiver from the transmitter.

3. The system as set forth in claim 2 and further including a compass to determine the direction of the transmitter with respect to the receiver after the antenna is directly facing the transmitter whereby a user may determine his location and distance from the transmitter.

4. The system as set forth in claim 2 wherein the signal is in the citizen band range.

5. The system as set forth in claim 2 wherein the antenna is a dipole antenna in a V-shaped configuration.

6. The system as set forth in claim 2 and further including a case for receiving and supporting the receiver and means to removably couple the case to an item of apparel of the user.

* * * * *